(12) United States Patent
Martin, Jr. et al.

(10) Patent No.: US 6,363,419 B1
(45) Date of Patent: Mar. 26, 2002

(54) METHOD AND APPARATUS FOR GENERATING IDLE LOOP SCREEN DISPLAYS ON MOBILE WIRELESS COMPUTING DEVICES

(75) Inventors: Bruce K. Martin, Jr., Palo Alto; David A. Chen, San Carlos; Lawrence M. Stein, San Jose; Bruce V. Schwartz; Gregory A. Heumann, both of San Mateo, all of CA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 09/286,499

(22) Filed: Apr. 5, 1999

(51) Int. Cl.[7] ............................................... G06F 13/00
(52) U.S. Cl. ........................ 709/219; 709/313; 709/328
(58) Field of Search ................................. 709/203, 217, 709/219, 223, 224, 227, 313, 328, 329

(56) References Cited
U.S. PATENT DOCUMENTS 5,737,619 A * 4/1998 Judson ........................ 707/500
5,809,242 A * 9/1998 Shaw et al. .................. 709/217
6,157,814 A * 12/2000 Hymel et al. ............... 455/31.1

* cited by examiner

*Primary Examiner*—Viet D. Vu
(74) *Attorney, Agent, or Firm*—Blakely, Sokoloff, Taylor & Zafman LLP

(57) ABSTRACT

A system for displaying idle content information on wireless computing devices during idle times is disclosed. The idle content information displayed on the wireless computing device might display the network operators customer support telephone number or advertisements. In one embodiment, a browser program within the wireless computing device is used to display other idle content information to the user during such time when the wireless computing device is idle. The browser program may be modified to support looping content, interaction with idle displays, automatic scrolling, and automatic updating of idle content information.

27 Claims, 4 Drawing Sheets

METHOD AND APPARATUS FOR GENERATING IDLE LOOP SCREEN DISPLAYS ON MOBILE WIRELESS COMPUTING DEVICES

FIELD OF THE INVENTION

The present invention relates to the field of wireless personal communication devices. In particular, the present invention discloses a method and apparatus for displaying user oriented information on the displays of wireless personal communication devices while such devices are idle.

BACKGROUND OF THE INVENTION

To provide information and communication services to today's busy mobile professionals, a new class of mobile computing devices has emerged. Notebook computers, palm-top computer systems, and cellular telephones all provide information services to traveling people. The mobile computing devices typically support a collection of personal information management applications such as phone books, electronic calendars, memo pads, and the like. Many mobile computing devices are also wireless communication devices such as cellular telephones and mobile network computers. Wireless communication devices typically support communication applications such as web browsers and email clients.

Many of these wireless computing devices are kept in a functioning state even when the user is not using the device in order to keep the wireless computing device in touch with the wireless communication network. Many wireless computing devices simply display a default status screen while the wireless computing device is not being used. A typical default status screen may include such information as radio signal strength, battery charge level, current date, time of day or current user options (e.g., menu of choices).

Although such status displays are somewhat useful, such static status displays provide limited information to the user who, however, has to glance at the display whenever he/she picks up the device. It would be desirable to display user oriented information, such as commercial information, an incoming appointment, or customer support telephone number so that it is nearly guaranteed that the user sees the user oriented information.

SUMMARY OF THE INVENTION

To more effectively use the display screen during idle time of wireless communication devices, the present invention introduces an idle content display system. For example, when a wireless computing device is not being used by the user the wireless computing device might display the network operators customer support telephone number, or advertisements.

In one embodiment, a browser program within the wireless communication device is used to display other idle content information to the user during such time when the wireless communication device is idle. The browser program may be modified to support looping content, interaction with idle displays, automatic scrolling, and automatic updating of idle content information.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art in view of the following detailed description in which.

DETAILED DESCRIPTION OF THE PREFERRED EMBODIMENT

Notation and Nomenclature

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention. For example, the present invention has been described with reference to the global Internet. However, the same techniques can easily be applied to other data networks.

The detailed description of the present invention in the following is presented largely in terms of procedures, steps, logic blocks, processing, and other symbolic representations that resemble data processing devices coupled to networks. These process descriptions and representations are the means used by those experienced or skilled in the art to most effectively convey the substance of their work to others skilled in the art. The method of the present invention along with the apparatus to be described in detail below is a self-consistent sequence of processes or steps leading to a desired result. These steps or processes are those requiring physical manipulations of physical quantities. Usually, though not necessarily, these quantities may take the form of electrical signals capable of being stored, transferred, combined, compared, displayed and otherwise manipulated in a computer system or electronic computing devices. It proves convenient at times, principally for reasons of common usage, to refer to these signals as bits, values, elements, symbols, operations, messages, terms, numbers, or the like. It should be borne in mind that all of these similar terms are to be associated with the appropriate physical quantities and are merely convenient labels applied to these quantities. Unless specifically stated otherwise as apparent from the following description, it is appreciated that throughout the present invention, discussions utilizing terms such as "processing" or "computing" or "verifying" or "displaying" or the like, refer to the actions and processes of a computing device that manipulates and transforms data represented as physical quantities within the computing device's registers and memories into other data similarly represented as physical quantities within the computing device or other electronic devices.

A Wireless Data Network

Figure 1:
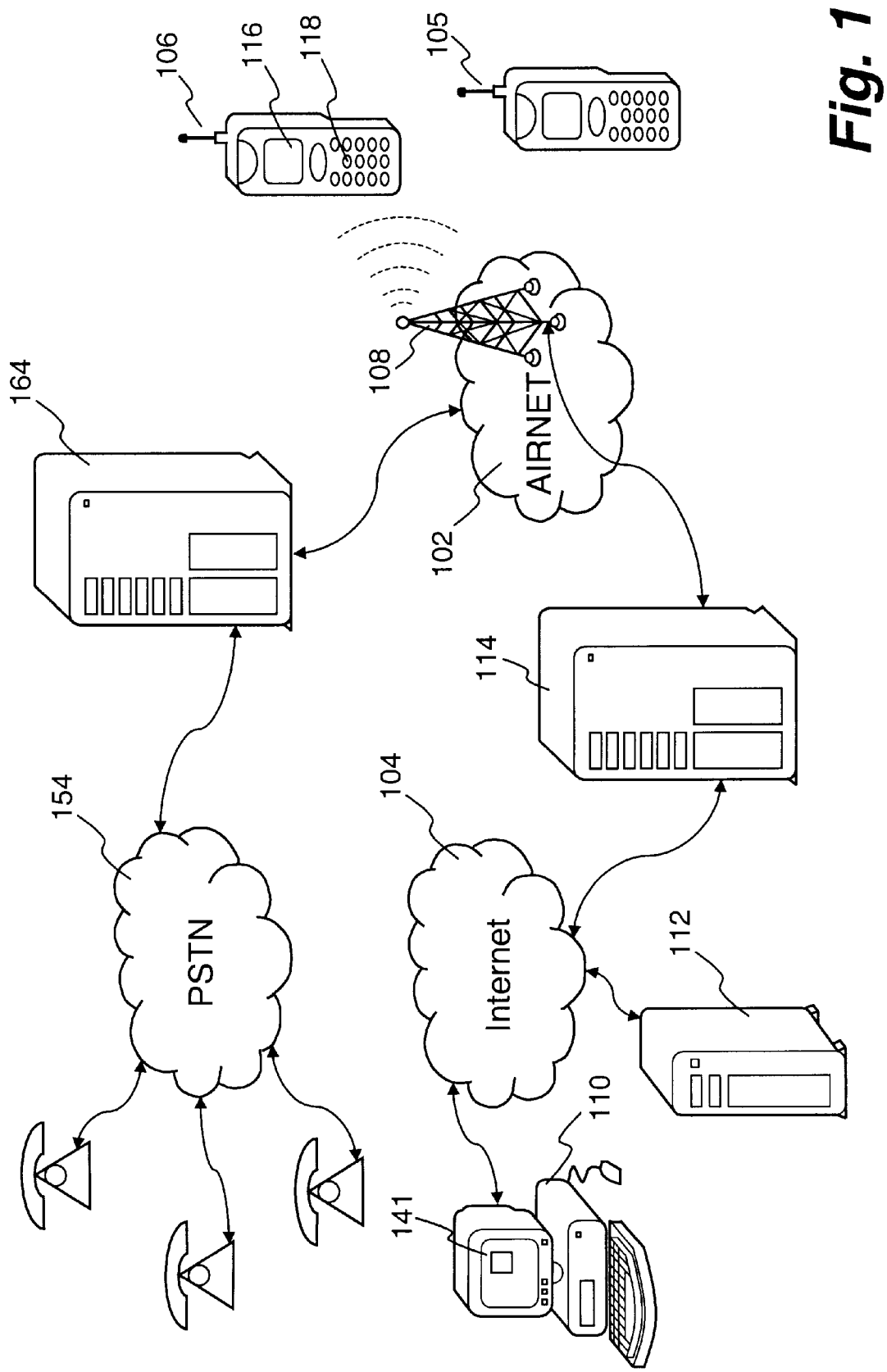
FIG. 1 illustrates a block diagram of a wireless network coupled to a data network.

Referring now to the drawings, in which like numerals refer to like parts throughout the several views. FIG. 1 illustrates a schematic configuration in which the present invention may be practiced. A wireless network referred to as airnet 102 is illustrated on the right of FIG. 1. Airnet 102, in which the data transmission is via electromagnetic radiation, is sometimes referred to as a carrier network as well because each airnet is controlled and operated by a carrier such as AT&T and GTE. Each carrier network may have its own communication scheme, such as CDPD, CDMA, GSM, and TDMA for airnet 102. Furthermore, each airnet 102 may comprise more than one different types of wireless network. For example, airnet 102 may comprise a GSM wireless network for some wireless client devices and a CDPD wireless network for other wireless client devices.

Referenced by 106 is one of the two-way interactive communication devices that can be a mobile computing device, a cellular phone, a wireless personal digital assistant, or a wireless capable remote controller, capable of communicating, via airnet 102, with an antenna 108 that also represents a carrier infrastructure. It is generally understood that the carrier infrastructure or antenna 108 serves simultaneously a plurality of the two-way interactive communication devices, of which only computing devices 105 and 106 are shown in the figure.

Wireless carrier infrastructure 108 generally comprises a plurality of base stations and an operation center for each type of wireless network supported. The base station controls radio or telecommunication links with the wireless computing device devices. The operation and maintenance center comprises a switching center performing the switching of calls between the wireless computing device and other fixed or wireless network users. Further, the operation and maintenance center manages mobile services, such as authentication and oversees the proper operation and setup of a wireless network. Each of the hardware components and processes in the base station and the operation and maintenance center for each type of wireless network is known to those skilled in the art and not to be described herein to avoid unnecessarily obscuring aspects of the present invention.

For telephone communication, the wireless carrier infrastructure 108 of the airnet 102 may be coupled to the public switched telephone network (PSTN) 154 through a telephone switch 164. By coupling the airnet 102 to the public switched telephone network (PSTN) 154, the devices 105 and 106 may establish, through proxy device 114, telephone connections with any of the millions of telephones on the public switched telephone network (PSTN) 154.

The wireless airnet 102 is further coupled to a data network 104 through a proxy server device 114. The data network 104 comprises a plurality of client systems 110 and a number of information server computers 112 (such as web servers), though only one representative, respectively, is shown in the figure. In a preferred embodiment, the data network 104 is the global Internet. Client computer system 110, as shown in the figure, may be an Intel processor based personal computer from Dell Computer, Inc. The personal computer system can execute a HTML Web browser such as the Netscape Navigator in order to communicate via the Internet 104 using HTTP to access information stored in information server 112 that may be a workstation from Sun Microsystems Inc. It is understood to those skilled in the art that personal computer 110 can store accessible information therein so as to become an information server as well.

The proxy server device 114, also referred to as proxy server or wireless data server or gateway server, that couples the airnet 102 to the data network 104 may be a workstation or a personal computer and performs mapping or translation functions. For example, the proxy server may map from one network protocol to another network protocol. Using the proxy server 114, a wireless computing device 106 may communicate with the computer servers 112 and the personal computers 110 on the data network 104. The proxy server 114 may host many other applications that may be used by wireless computing devices and computers coupled to the Internet 104.

The communication protocol of the World Wide Web (WWW) on the Internet 104 is the well-known HyperText Transport Protocol (HTTP) or HTTPS, a secure version of HTTP. HTTP runs on top of the Transport Control Protocol (TCP) and the Internet Protocol (IP). HTTP is used to transfer information in the forms such as HTML and HDML between the proxy server 114 and one of the HTML web servers that may reside in the computers 110 or 112.

The communication protocol between wireless computing device 106 and proxy server 114 via airnet 102 may be one of the protocols specific to a wireless network. Examples of the protocols may include Wireless Session Protocol (WSP) and Handheld Device Transport Protocol (HDTP). WSP or HDTP preferably running on User Datagram Protocol (UDP) is used to control the connection of a browser program in wireless computing device 106 to proxy server 114. The browser program in the wireless computing device 106 may support one or more of markup languages, such as Wireless Markup Language (WML), Handheld Device Markup Language (HDML) and compact HyperText Markup Language (cHTML). Similar to regular HTML, cHTML, WML or HDML language are a tag based document language that comprises a set of commands or statements specified in a file that specifies how information is to be displayed on a small screen of the wireless computing device 106. To facilitate the description of the present invention according to one embodiment, WML and HDML will be considered below. A browser program called microbroswer that supports both WML and HDML and operates on both WSP and HDTP may be obtained from Unwired Planet, Inc. located at 800 Chesapeake Drive, Redwood City, Calif. 94063.

Normally a number of cards are grouped into a deck that is the smallest unit of HDML information that can be exchanged between the wireless computing device 106 and the proxy server 114. The specifications of HDTP, entitled "HDTP Specification", and HDML, entitled "HDML 2.0 Language Reference" are enclosed and incorporated herein by reference in their entirety. Furthermore, additional information about the Wireless Session Protocol (WSP) and the Wireless Mark-up language (WML) of the Wireless Access Protocol (WAP) can be found at the Wireless Application Protocol Forum's Internet web site located at http://www.wapforum.org/.

WSP and HDTP are session-level protocols that are similar to HTTP, but WSP and HDTP are designed to incur less overhead since both are designed for use in lower bandwidth wireless environments. For example, the WSP and HDTP protocols have been designed to minimize the number of packets that need to be exchanged when, negotiating a connection between a wireless client device and a wireless server before information can be exchanged. Furthermore, WSP and HDTP are optimized for use within thin client devices, such as wireless computing devices including cellular telephones and personal digital assistants. Wireless computing devices typically have significantly less computing power and memory than desktop personal computers. Exchanging a very small number of packets is one of the desired features for a wireless computing device with very limited computing power and memory in order to effectively interact with a landline device.

A Wireless Computing Device

To facilitate the description of the disclosed system, some of the features in wireless computing device 106 are recited.

According to one embodiment, wireless computing device 106 is a mobile telephone, such as a cellular telephone, with a display screen 116 and a keypad 118 that allow a user thereof to communicate interactively with the mobile device. The digital hardware components including a microcontroller, a read-only memory (ROM), and random access memory (RAM) in mobile telephone 106 are known to those skilled in the art. In a preferred embodiment, the ROM contains compiled and linked processing for displaying information encoded in the Wireless Application Protocols (WAP).

The compiled and linked processes for displaying WAP information typically cause wireless computing device 106 to communicate with proxy server 114. With display screen 116 and keypad 118, a user of wireless computing device 106 can interactively communicate with proxy server 114 over airnet 102. Upon activation of a predetermined key sequence utilizing keypad 118, for example, the microcontroller initiates a communication session request to proxy server 114. Upon establishing the communication session, wireless computing device 106 typically receives a single deck from proxy server 114 and stores the deck as cached in the RAM, wherein the deck is meant a group of screen displays, each of the screen displays hence considered as a card. The number of cards in a card deck is selected to facilitate efficient use of the resources in wireless computing device 106 and in airnet network 102.

Idle Content Display for Wireless Clients on a Wireless Data Network

The display screen 116 in a mobile device 106 is normally used to display user prompts and output data. User prompts consist of information that helps the users operate the mobile device 106. Common user prompts include text and icons such as "Enter a phone number" or a picture of a telephone. Output data is displayed when a user has made an information request and the output data is the resultant data.

When mobile device 106 is idle, i.e. a user is not actively interacting with the device, there is no need to display information to the user. Some mobile devices simply display a blank screen (or screen off) to conserve power. However, many mobile devices present a status screen that conveys mobile device 106 status to the user. For example, an idle status screen for a typical cellular telephone would display network availability and battery power or simply the status of the device.

Figure 2:
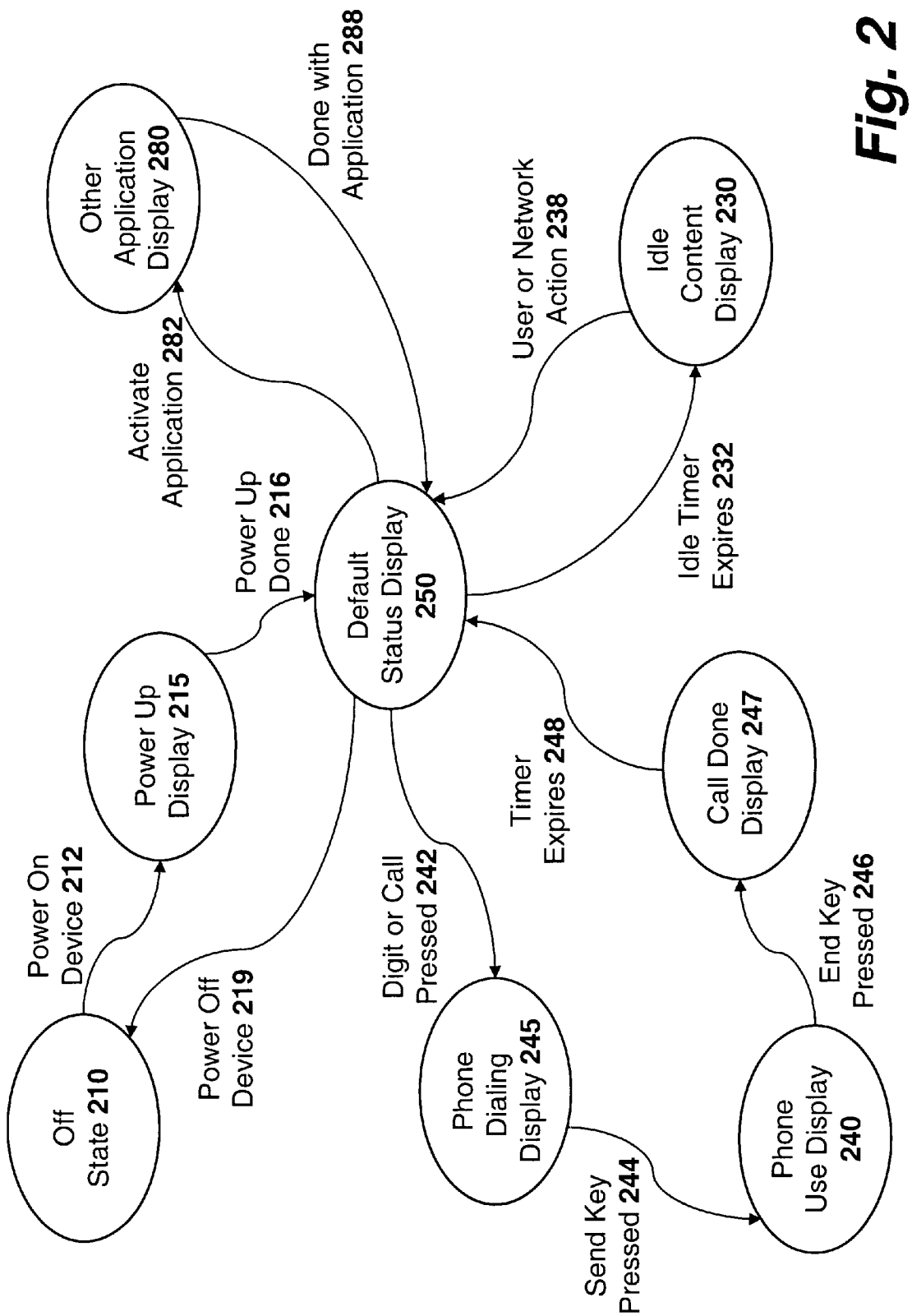
FIG. 2 illustrates a state diagram for a wireless computing device that displays idle content when the wireless computing device is idle.

To more efficiently use the display screen real estate, the present invention introduces new uses for the displays of idle mobile devices. FIG. 2 illustrates a state diagram for display states on a mobile device that uses the idle display screen space. Referring to FIG. 2, a mobile device starts in a powered off state 210. When a user powers on 212 the mobile device, the mobile device enters a power up state 215 where self tests are performed. After the power up completes 216, the mobile device displays a default status display 250. When the mobile device enters the default status display 250 state, the mobile device sets an idle timer.

If the user enters a command (such as press a key) or a wireless network initiates a communication transaction (for example, an incoming call) before the idle timer expires, then the user's command or the network transaction is handled. For example, referring to FIG. 2, if the user presses a digit for a telephone number 242 then the mobile device enters a phone dialing display state 245. When the call is initiated by pressing a "send" key 244 then the mobile device enters a telephone use state 240. The telephone use state 240 may display information relevant to the call such as the battery power, the telephone number dialed, and the current call time length. When the call is complete, possibly indicated by pressing an "end" key 246, the mobile device enters a finished call display state 247 for a limited time period. After the limited time period expires 248, the mobile device returns to the default status display 250. When returning to this default status display 250, the mobile device again sets an idle timer.

If the idle timer expires 232 while the mobile device is in the default status display 250, then the mobile device enters an idle content display state 230. The idle content display state 230 provides the wireless network service provider with an opportunity to provide information ("content") to the mobile service subscribers while the subscribers are not using their mobile devices ("idle"). The idle content may comprise information about the mobile service such as technical support (numbers, email addresses or links), current network conditions, newly available features, etc. Alternatively, the idle content may comprise personalized information, such as a reminder that there is a waiting voice mail/email, news headlines that may be of interest the user, updated traffic/weather report as well as advertising about the mobile service provider's service such as special pricing offers or advertising from third parties.

To ensure that all the features of the mobile device are still available to users, the mobile device may return to the default status display 250 when the mobile device detects any user or network action 238. For example, if the user presses a key that is not associated with the idle content display, then the mobile device returns to the default status display 250 and provides the identity of the pressed key to the appropriate handler. Similarly, if the mobile device detects activity initiated by the wireless network, then the wireless computing device returns to the default status display state 250 such that the wireless network activity may be handled appropriately. For example, if a cellular telephone call is directed toward the mobile device, then the mobile device returns to the default status display state 250 such that the telephone call will be handled appropriately.

The information displayed by the idle content display system may be provisioned into each mobile device when the mobile device is first activated. To supply new and current information to the idle content display system, it would be desirable to implement the idle content display system in a manner that allows the wireless communication service provider the ability to update the idle content information that will be displayed. This goal may be achieved in a number of different manners.

One method is to have each mobile device access a well-known element of the wireless network. For example, the proxy server 114 that links the wireless network 102 to the global Internet may provide information to be displayed during idle times. The mobile devices could periodically reload information from that proxy server 114 such that new information placed onto the proxy server 114 would be propagated into the mobile devices 105 and 106 for display during idle times.

Another method of updating the information to be displayed during idle times is to have the wireless network 102 periodically "push" information to the individual mobile devices. This may be accomplished using a periodic broadcast message that is received by all active mobile devices. Alternatively, the wireless network may send individual idle content update messages to each active mobile device or embedded in a requested file. In one embodiment, each mobile device receives the idle content information each time the mobile device is turned on and the idle content information may be cached in a memory of the mobile device.

A Browser Based Idle Display

To implement an idle content display system, one embodiment of the present invention uses a browser program based idle content display system. A browser program is a program that accepts navigation commands from a user to access specific encoded information and then displays information on the local display in an appropriate manner. The microbrowser from Unwired Planet, Inc. is a suitable browser program for the mobile devices and operates a suite of protocols known as the Wireless Application Protocol (WAP). The Wireless Application Protocol suite includes a Wireless Session Protocol for handling wireless computing device communication sessions and a Wireless Markup Language (WML) for providing a coded markup language used to generate displays on wireless devices. The Wireless Application Protocol suite has been specifically designed for wireless computing device platforms that typically have less memory, less processing power, lower communication bandwidth availability, and smaller display screens than desktop computing systems.

In one embodiment of the present invention a browser program that implements the WAP suite of protocols is used to generate the idle content display. Referring again to FIG. 2, when the idle timer expires 232 the wireless computing device runs a browser program to generate the idle content display 230. The actual information content displayed by the browser program may be set specifying a default idle content address. In one embodiment, the default idle content address is provided to the browser program in the form of a Uniform Resource Identifier (URI) or Uniform Resource Locator (URL) that designates where encoded information may be accessed.

In one embodiment, each mobile device is given a defined "idle content" address identifier (URI or URL). The idle content address identifier provides a link to the content information that the wireless network provider wishes to have displayed on the mobile device during idle time. The idle content address identifier may be provided to the mobile devices at a variety of different times. For example, the idle content address identifier may be provisioned into each device before sale, it may be provisioned into each device upon activation, or it may be sent when a device is turned on and establishes a network connection. Further, the idle content address identifier may be periodically sent along with other network traffic. For example, the idle content address identifier may be included in a header field of a digital packet. The idle content address identifier may also be pushed to the network devices periodically. One method of pushing the idle content address identifier would be to use existing standard over-the-air provisioning and configuration mechanisms such as Over The Air Service Provisioning (OTASP) and Over The Air Parameter Administration (OTAPA).

In the browser based idle content display system, when the idle timer expires, the browser fetches the idle content information addressed by the idle content address identifier from the wireless network and displays that idle content information. By using a browser, standard browser content handling mechanisms, such as content caching and persistence, can be used to minimize the number of requests to the idle content server. In one embodiment, the idle content information addressed by the idle content URL would be pre-fetched by the browser (in the background) during a time the user last operated the browser. In such an embodiment the idle content information would always be immediately available for display to the user without requiring a network connection at idle time.

The following Wireless Markup Language file provides an example of idle content that might be delivered to a wireless computing device. This example is a three-screen display, where each screen is displayed for 30 seconds before transitioning to the next. The network operator's name/brand is displayed on the first, an advertisement for new telephone services on the second, and a personal message on the third.

Idle Content Code Listing 1

```
<wml>
    <card id="C1" ontimer="#C2">
    <timer value="300"/>
    <p>
        Welcome to Transitel ©.
        <br/>
        www.transitel.net
    </p>
    </card>
    <card id="C2" ontimer="#C3">
    <timer value="300"/>
    <p>
        Get free voice minutes!
        <br/>
        <a
    href="http://www.transitel.net/wml/promo/first.wml">
        Press OK for details</a>
    </p>
    </card>
    <card name="C3" ontimer="#C1">
    <timer value="300"/>
    <p>
        You have 3 email messages!
        <a
    href="http://www.transitel.net/wml/mail/inbox.wml">
        Press OK to see messages.</a>
    </p>
    </card>
</wml>
```

Browser Modifications

The browser's "idle mode" performs very much like a standard browser program, with a few exceptions. One difference is that any user input (e.g., key presses) or network events (e.g., incoming phone call) on the wireless computing device cause the browser to stop displaying "idle content" on the screen and return control to the normal inactive state. The browser may inform the normal inactive state program about the event that caused the browser relinquish control of the mobile device. For example, when the user presses a telephone digit, that telephone digit may be passed to the program that generates the normal inactive state display.

In one embodiment, the mobile device might allow the user to interact with the idle content displayed during idle times. This would require the browser of the mobile device to distinguish between the cases where the user wants to "exit" back to the default screen, and where they want to actually interact with the idle content. For instance, the idle content may contain links for a user to get more information about a particular product or service of interest.

Figure 3:
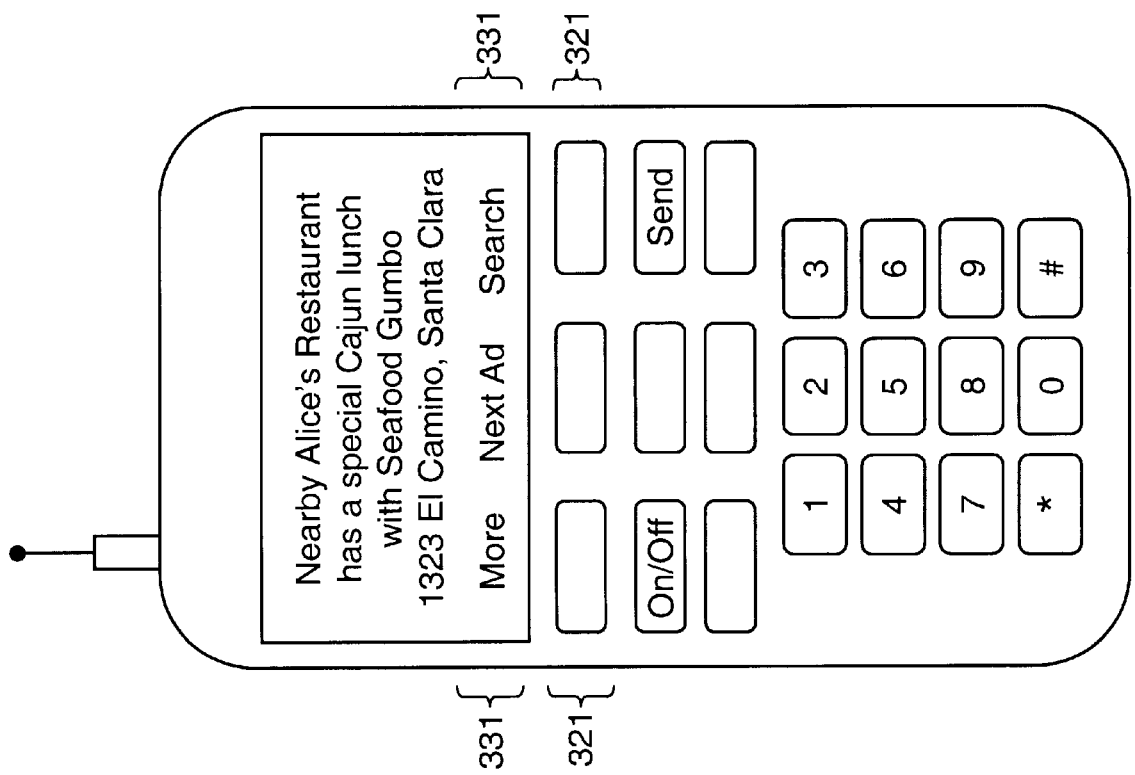
FIG. 3 illustrates one embodiment of a wireless computing device that uses soft keys for interaction with idle content.

One method of implementing such a feature would be to designate certain keys (i.e. soft keys and arrow keys) as related to the idle content information on the display screen and other keys (i.e. numerical keys) as not directly related to the idle content information on the display screen. For example, in one embodiment, a set of programmable soft keys may be used to interact with the idle content information. The programmable soft keys may be located adjacent to the display screen such that the display screen area near the soft keys can designate the current function of the soft keys. FIG. 3 illustrates one example of such an embodiment. When one of any numerical keys is activated, the default screen, a screen before the idle content is displayed, is resumed.

In the example of FIG. 3, the row of soft keys 321 are related to the idle content information display. A sub area 331 of the display screen 330 informs the user of the current functions of the soft keys. In the example of FIG. 3, the user may interact with the idle content using the soft keys 321. Specifically, the user may obtain "more" information about the current advertisement (by using an embedded URL link in one embodiment), view the "next" advertisement, or "search" for desired information. The remainder of the keys could be used for non idle content functions. For example, if one of the digit keys 350 is pressed, then the wireless computing device may exit the idle content state and enter a telephone dialing state.

Another feature in the present invention is the ability to support "looping" content. Looping content is used to display a variety of different messages since the "idle mode" can occur for a long period of time and it would be desirable to display more than one idle content message. Thus, in a preferred embodiment, the "idle content" may be rendered as a self-navigating series of informative screens that will be organized in a loop. Specifically, once the last screen in a series is displayed for a predetermined time period, the browser will return to the first screen of the looping content. For example, a browser adapted for idle content may sequentially and repeatedly display the three screens supported in the code of idle content code listing 1 when the mobile device is in the idle content display mode.

Autoscrolling

It is difficult to determine how much information (e.g., text) will fit on a single small device screen. This is especially true since varying wireless computing devices will use varying display screen sizes. It would be therefore be optimal for the browser to "auto-scroll" the idle content without user interaction. With autoscrolling, the browser will begin scrolling the content automatically at a pace that would be comfortable for the user to read when the idle content being displayed contains more content that can fit on the screen. The idle content could scroll vertically and/or horizontally and move in either direction (e.g. UP/DOWN, LEFT/RIGHT).

In a one embodiment, the markup language includes a tag to specify how autoscrolling should be used. For example, in the Wireless Markup Language, the AUTOSCROLL tag could be used to specify how autoscrolling would occur for a WML card. For example, the following Wireless Markup Language (WML) code designates how one particular idle content display should be autoscrolled:

Idle Content Code Listing 2

```
<wml>
  <card id="C1" ontimer=#C2">
    <autoscroll direction="up" speed="1" start="20"/>
    <timer value="300"/>
```

Idle Content Code Listing 2 -continued

```
    <p>
      Welcome to Transitel ©.
      <br/>
      You can access www.transitel.net
      to see/edit data from your PC!
    </p>
  </card>
  <card id="C2" ontimer="#C3">
    <autoscroll direction="up" speed="1" start="20"/>
    <timer value="300"/>
    <p>
      Get free voice minutes
      by using your browser!
      <br/>
      <a
    href="http://www.transitel.net/wml/promo/first.wml">
      Press OK for details</a>
    </p>
  </card>
  <card name="C3" ontimer="#C1">
    <autoscroll direction="up" speed="1" start="20"/>
    <timer value="300"/>
    <p>
      You have 3 email messages!
      Two messages are from
      John Smith and are marked
      urgent.
      <a
    href="http://www.transitel.net/wml/mail/inbox.wml">
      Press OK to see messages.</a>
    </p>
  </card>
</wml>
```

In idle content code listing 2, the browser would display the top portion of the first card (C1) for 2 seconds. The browser would then "auto-scroll" the content of card C1 up in a vertical fashion until the last line was viewable. After 10 additional seconds, the browser would then navigate to the second card, where a similar behavior would take place.

Idle Content During Browser Wait Periods.

In addition to the normal idle times, the teachings of the present invention could be used during other times wherein little other display activity is occurring. In particular, the idle content teachings can be used during mobile device wait times. There are several different times when the mobile device must wait for a response before proceeding. During such times, the browser could display the idle content. In one embodiment, a sub area of the display screen is used to provide feedback on the activity that is causing the wait. For example, the mobile device may display a progress bar in a corner of the display screen wherein the progress bar conveys the progress of the activity that is causing the wait.

The first wait time that occurs is when a user activates a mobile device, for example, the mobile device is turned on. The mobile device needs to establish a connection with a wireless network (a server if available). During the network connection time, the browser could be invoked to display idle content information that was cached in the mobile device at an earlier time.

Another time that could be used to display idle content is when the mobile device exchanges session and security information with a network server. During the communication handshakes, the browser may display idle content on the display.

Even the standard browsing network wait time could be used to display idle content. Specifically, when a user requests information from an external URL, the browser could display idle content information while the domain name look-up and the information fetching from the external server was performed. It should be pointed out that there are many occasions in which the idle content can be displayed. It is a matter of implementation preference.

The main difference between displaying idle loop content during "waiting" periods and displaying idle content during idle times is that the browser is already in use during most waiting periods. Therefore, the browser would need to determine when idle content information should be displayed and when the idle content information should be removed. The browser would also have to interpret any user interaction as applying to the either the primary content (that has driven the waiting period with the user request) or the idle content currently displayed.

Location Sensitive Content

Figure 4:
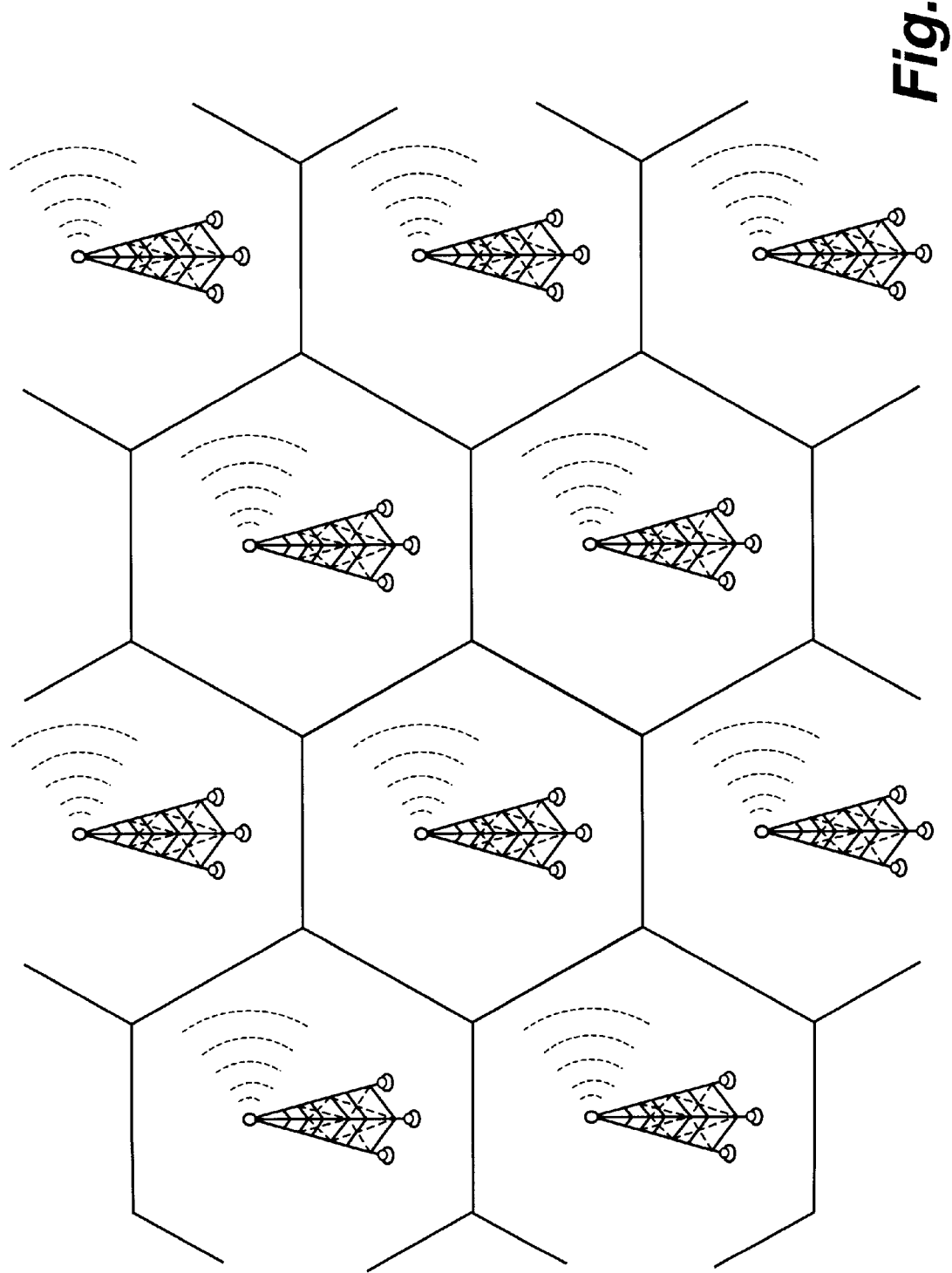
FIG. 4 illustrates a conceptual diagram of a cellular wireless network system.

Most two-way wireless communication systems are built using a "cellular" architecture. In a cellular system, the wireless network coverage area is broken into a set of smaller "cell" areas. Each cell has its own base station that transmits and receives information to devices within its cell. For example, FIG. 4 illustrates a typical cellular arrangement wherein each base station transmission tower sends and receives wireless information to and from the wireless computing devices within its cell.

When a mobile device moves from an original cell to a next cell, a "hand-off" occurs wherein the base station transmission tower from the original cell "hands off" responsibility for the moving device to the new cell transmission tower in the next cell. In such situations, the mobile device is informed of the handoff such that the mobile device will contact the correct base station transmission tower.

The present invention can utilize this cellular hand-off operation as a time to send a new idle content address identifier. In one embodiment, the cellular wireless network uses the new cell location to generate specific idle content for the mobile device's specific geographic location. Furthermore, the mobile device's geographic location information may be combined with the current time to select very well targeted idle content. It should be noted that this cellular hand-off operation is one of the examples that enables a mobile device to receive geographic user-oriented information, there are other ways including operator controlled distributions to a group of devices based on a set of selected parameters or user oriented distributions based on geographic notifications from devices.

For example, the idle content may be used to deliver targeted advertising. When a cellular hand-off occurs, the cellular wireless network will determine the mobile device's approximate geographic location using the location of new cell area. In this manner, businesses within that cell area can advertise to the remote devices located within that cellular area. When time information is taken into consideration, even better targeted advertisements may be delivered. For example, from 11:00 am to 1:00 pm, the cellular wireless network may set the idle content URL to distribute advertisements for restaurants in the particular cell area that serve lunch.

The foregoing has described a method of displaying idle content information on a mobile device with a display screen. It is contemplated that changes and modifications may be made by one of ordinary skill in the art, to the materials and arrangements of elements of the present invention without departing from the scope of the invention as claimed as follows:

We claim:

1. A method of displaying idle content information on a wireless mobile device, said method comprising:
   receiving from a wireless network idle content information specified by an address identifier identifying a network resource in said wireless network;
   said network resource comprising said idle content information;
   determining whether said wireless device is idle; and
   displaying said idle content information when said wireless device is idle.

2. The method as claimed in claim 1, said method further comprising: fetching said idle content information according to said address identifier when
   said wireless device is communicating with a wireless network.

3. The method as claimed in claim 1, said method further comprising: periodically fetching said idle content information according to said address
   identifier while said wireless computing device is communicating with a wireless network.

4. The method as claimed in claim 1 wherein said address identifier comprises a uniform resource identifier, and said network resource comprises a server that provides said idle information towards said wireless mobile device.

5. The method as claimed in claim 1 wherein displaying said idle content information is performed by a browser program in said wireless mobile device.

6. The method as claimed in claim 5 wherein said browser program responds to a first set of commands as related to said idle content and a second set of commands as unrelated to said idle content.

7. The method as claimed in claim 5 wherein said browser program loops through said idle content information.

8. The method as claimed in claim 1, said method further comprising:
   updating said idle content information when said wireless mobile device moves from one geographic location to another geographic location.

9. The method as claimed in claim 8 wherein said idle content information comprises geographically targeted information.

10. The method as claimed in claim 8 wherein said idle content information comprises information personalized for a user of the wireless mobile device.

11. The method as claimed in claim 1 wherein said wireless mobile device is a cellular telephone.

12. A wireless computing apparatus, said apparatus comprising:
    a wireless network interface for coupling to a wireless network;
    a browser program, said browser program communicating with an idle content server on said wireless network to obtain idle content, said browser program displaying said idle content information when said wireless computing device is in an idle state.

13. The apparatus as claimed in claim 12 wherein said wireless computing device fetches said idle content information when said wireless computing device is activated.

14. The apparatus as claimed in claim 12 wherein said wireless computing device periodically fetches said idle content information when said wireless computing device is active.

15. The apparatus as claimed in claim 12 wherein said idle content server periodically transmits said idle content information to said wireless computing device.

16. The apparatus as claimed in claim 12 wherein said idle content information is accessed using a uniform resource locator.

17. The apparatus as claimed in claim 12 wherein said browser program responds to a first set of commands as related to said idle content and a second set of commands as unrelated to said idle content.

18. The apparatus as claimed in claim 12 wherein said browser program loops through said idle content information.

19. The apparatus as claimed in claim 12 wherein said wireless network comprises a cellular network and wherein said wireless computing device receives new idle content information when said wireless computing device moves from a first cellular area to a second cellular area.

20. The apparatus as claimed in claim 19 wherein said idle content information comprises geographically targeted advertising.

21. The apparatus as claimed in claim 19 wherein said idle content information comprises geographically and temporally targeted advertising.

22. The method as claimed in claim 1 wherein determining whether said wireless device is idle comprises monitoring for predetermined indicia of use, the device being treated as idle if no such indicia occurs within a predetermined period.

23. The method of claim 2, wherein the indicia comprises a user entered command.

24. The method of claim 2, wherein the indicia comprises a communication transaction initiated by the wireless network.

25. A wireless computing apparatus, said apparatus comprising:
 a wireless network interface for coupling to a wireless network;
 a mechanism for monitoring predetermined indicia of use for a predetermined time and in response to such use to cause the apparatus to move from an active state to an idle state; and
 a browser program, said browser program communicating with an idle content server on said wireless network to obtain idle content, said browser program displaying said idle content information when said wireless computing device is in an idle state.

26. The apparatus of claim 25 wherein the indicia comprises a user entered command.

27. The apparatus of claim 25, wherein the indicia comprises a communications transaction initiated by the wireless network.

* * * * *

US006363419C1

(12) EX PARTE REEXAMINATION CERTIFICATE (10823rd)
United States Patent
Martin, Jr. et al.

(10) Number: US 6,363,419 C1
(45) Certificate Issued: Feb. 25, 2016

(54) METHOD AND APPARATUS FOR GENERATING IDLE LOOP SCREEN DISPLAYS ON MOBILE WIRELESS COMPUTING DEVICES

(75) Inventors: Bruce K. Martin, Jr., Palo Alto, CA (US); David A. Chen, San Carlos, CA (US); Lawrence M. Stein, San Jose, CA (US); Bruce V. Schwartz, San Mateo, CA (US); Gregory A. Heumann, San Mateo, CA (US)

(73) Assignee: UNWIRED PLANET, LLC, Reno, NV (US)

Reexamination Request:
No. 90/013,512, Jun. 9, 2015

Reexamination Certificate for:
Patent No.: 6,363,419
Issued: Mar. 26, 2002
Appl. No.: 09/286,499
Filed: Apr. 5, 1999

(51) Int. Cl.
*H04M 1/72* (2006.01)
*H04M 1/725* (2006.01)
*G06Q 30/02* (2012.01)
*H04W 4/02* (2009.01)

(52) U.S. Cl.
CPC ........... *G06Q 30/02* (2013.01); *H04M 1/72561* (2013.01); *H04W 4/02* (2013.01); *H04M 1/72544* (2013.01); *H04M 1/72547* (2013.01)

(58) Field of Classification Search
None
See application file for complete search history.

(56) References Cited

To view the complete listing of prior art documents cited during the proceeding for Reexamination Control Number 90/013,512, please refer to the USPTO's public Patent Application Information Retrieval (PAIR) system under the Display References tab.

*Primary Examiner* — Matthew Heneghan

(57) ABSTRACT

A system for displaying idle content information on wireless computing devices during idle times is disclosed. The idle content information displayed on the wireless computing device might display the network operators customer support telephone number or advertisements. In one embodiment, a browser program within the wireless computing device is used to display other idle content information to the user during such time when the wireless computing device is idle. The browser program may be modified to support looping content, interaction with idle displays, automatic scrolling, and automatic updating of idle content information.

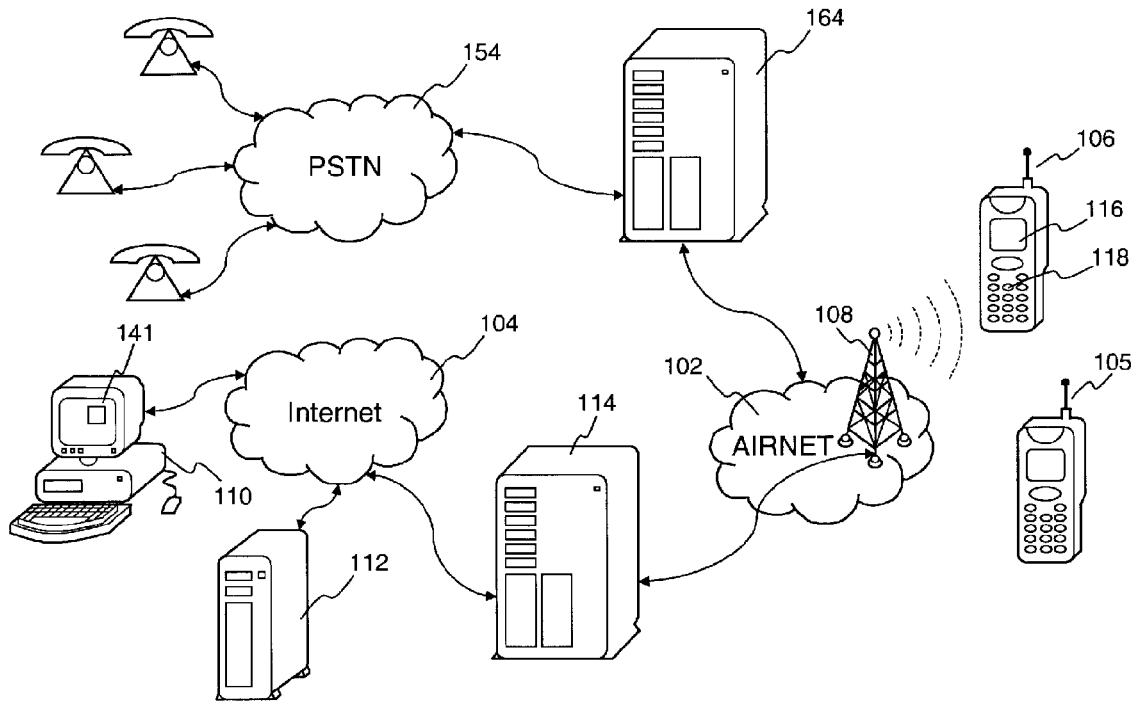

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

New claims 28-86 are added and determined to be patentable.

Claims 2-27 were not reexamined.

1. A method of displaying idle content information on a wireless mobile device, said method comprising:
   receiving, from a wireless network, idle content information specified by an address identifier identifying a network resource in said wireless network[;], *said network resource comprising said idle content information*;
   determining whether said wireless *mobile* device is idle;
   [and]
   displaying said idle content information when said wireless *mobile* device is idle *and after the wireless mobile device has entered an idle state;*
   *receiving, when the wireless mobile device is in the idle state, a user input via a user interface of the wireless mobile device, the user interface being configured to receive different commands from different parts of the user interface;*
   *if the user input is received in a first predetermined part of the user interface that is visually associated with but not the same as the displayed idle content information, activating a first command to cause the wireless mobile device to interact with said idle content information; and*
   *if the user input is received in a second predetermined part of the user interface that is different than the first predetermined part and that is not visually associated with the displayed idle content information, activating a second command that is different than the first command, the second command causing the wireless mobile device to enter a different state than the idle state.*

*28. The method of claim 1, wherein the idle content information comprises an advertisement, the displaying the idle content information includes displaying the advertisement in an area, and the area occupied by the advertisement is different than the first predetermined part of the user interface.*

*29. The method of claim 28, further comprising displaying text relating to interacting with the advertisement that is separate from the advertisement, and wherein the first predetermined part of the user interface is associated with the text.*

*30. The method of claim 1, further comprising, if the user input is received in a third predetermined part of the user interface that is different than the first predetermined part and different than the second predetermined part, activating a third command to enter a telephone dialing state.*

*31. The method of claim 1, wherein said idle content information comprises a plurality of selectable information elements, and wherein the first command is activated in response to selection of at least one of the plurality of selectable information elements.*

*32. The method of claim 31, wherein the at least one of the plurality of selectable information elements relates to an email message.*

*33. The method of claim 31, wherein the first command relates to the at least one of the plurality of selectable information elements.*

*34. The method of claim 33, further comprising, responsive to the activation of the first command, displaying additional information relating to the at least one of the plurality of selectable information elements.*

*35. The method of claim 34, wherein the at least one of the plurality of selectable information elements relates to an email message and wherein the additional information which is displayed comprises the email message.*

*36. The method of claim 34, further comprising retrieving the additional information via a Uniform Resource Locator (URL) link.*

*37. The method of claim 31, further comprising scrolling, in the idle state, the plurality of selectable information elements, whereby different ones of the plurality of selectable elements are displayed during the scrolling.*

*38. The method of claim 1, further comprising entering the idle state when the wireless mobile device is idle for a predetermined period of time.*

*39. The method of claim 38, wherein the wireless mobile device is configured to return to a default display state upon exit from a plurality of additional states.*

*40. The method of claim 1, wherein the different state is a default, non-idle, state of the wireless mobile device.*

*41. The method of claim 40, wherein the default, non-idle, state is a state which is exited when an application is activated, and which is entered when the application is deactivated.*

*42. The method of claim 1, further comprising, responsive to the activation of the first command, displaying additional information relating to said idle content information.*

*43. The method of claim 42, further comprising retrieving the additional information via a Uniform Resource Locator (URL) link.*

*44. The method of claim 1, further comprising not displaying said idle content information for at least some time during the idle state of said wireless mobile device when said wireless mobile device is idle.*

*45. The method of claim 1, further comprising entering the idle state in response to determining that the wireless mobile device is idle.*

*46. A method of displaying idle content information on a wireless mobile device, said method comprising:*
   *receiving, from a wireless network, idle content information specified by an address identifier identifying a network resource in said wireless network, said network resource comprising said idle content information, said idle content information comprising information for use in notifying a user of the wireless mobile device that an email message has been received for the user, said idle content information including information identifying a sender of the email message;*
   *determining whether said wireless mobile device is idle; and*
   *displaying said idle content information when said wireless mobile device is idle and after the wireless mobile device has entered an idle state.*

*47. The method of claim 46, wherein said idle content information includes information indicating a number of email messages that have been received for the user of the wireless mobile device.*

48. The method of claim 46, further comprising, in the idle state, displaying information elements in addition to said idle content information for use in notifying the user of the wireless mobile device that the email message has been received for the user.

49. The method of claim 46, wherein said idle content information comprises a plurality of selectable information elements, and wherein at least one of the plurality of selectable information elements relates to information for use in notifying the user of the wireless mobile device that the email message has been received for the user.

50. The method of claim 49, further comprising, responsive to selection of the at least one of the plurality of selectable information elements relating to information for use in notifying a user of the wireless mobile device that the email message has been received for the user, displaying the email message.

51. The method of claim 49, further comprising, in the idle state, scrolling the plurality of selectable information elements, whereby different ones of the plurality of selectable elements are displayed during the scrolling.

52. The method of claim 49, wherein the at least one of the plurality of selectable information elements relates to voicemail.

53. The method of claim 46, further comprising entering the idle state when the wireless mobile device is idle for a predetermined period of time.

54. A method of displaying idle content information on a wireless mobile device, said method comprising:
receiving, from a wireless network, idle content information specified by an address identifier identifying a network resource in said wireless network, said network resource comprising said idle content information, said idle content information comprising information for use in notifying a user of the wireless mobile device that a personal message has been received for the user, the information for use in notifying the user of the wireless mobile device that the personal message has been received for the user comprising information identifying a sender of the personal message;
determining whether said wireless mobile device is idle; and
displaying said idle content information when said wireless mobile device is idle and after the wireless mobile device has entered an idle state.

55. A method of displaying idle content information on a wireless mobile device, said method comprising:
receiving, from a wireless network, idle content information specified by an address identifier identifying a network resource in said wireless network, said network resource comprising said idle content information;
determining whether said wireless mobile device is idle;
displaying said idle content information when said wireless mobile device is idle and after the wireless mobile device has entered an idle state;
responding, in the idle state of said wireless mobile device, to a first command received in a first predetermined part of a user interface that is visually associated with but not the same as the displayed idle content information, by displaying additional information relating to said idle content information; and
responding, in the idle state of said wireless mobile device, to a second command received in a second predetermined part of the user interface that is different than the first predetermined part and that is not visually associated with the displayed idle content information, the second command being different than the first command, by entering a different state from the idle state.

56. The method of claim 55, further comprising, if a user input is received in a third predetermined part of the user interface that is different than the first predetermined part and different than the second predetermined part, activating a third command to enter a telephone dialing state.

57. The method of claim 55, wherein said idle content information comprises a plurality of selectable information elements, and wherein the first command is activated in response to selection of at least one of the plurality of selectable information elements.

58. The method of claim 57, wherein the at least one of the plurality of selectable information elements relates to an email message.

59. The method of claim 57, wherein the first command relates to the at least one of the plurality of selectable information elements.

60. The method of claim 59, further comprising, responsive to the activation of the first command, displaying additional information relating to the at least one of the plurality of selectable information elements.

61. The method of claim 60, wherein the at least one of the plurality of selectable information elements relates to an email message and wherein the additional information which is displayed comprises the email message.

62. The method of claim 60, further comprising retrieving the additional information via a Uniform Resource Locator (URL) link.

63. The method of claim 57, further comprising, in the idle state, scrolling the plurality of selectable information elements, whereby different ones of the plurality of selectable elements are displayed during the scrolling.

64. The method of claim 55, wherein the different state is a default, non-idle, state of the wireless mobile device.

65. The method of claim 64, wherein the default, non-idle, state is a state which is exited when an application is activated, and which is entered when the application is deactivated.

66. The method of claim 55, further comprising, responsive to the activation of the first command, displaying additional information relating to said idle content information.

67. The method of claim 66, further comprising retrieving the additional information via a Uniform Resource Locator (URL) link.

68. The method of claim 55, further comprising not displaying said idle content information for at least some time during the idle state of said wireless mobile device when said wireless mobile device is idle.

69. The method of claim 55, further comprising entering the idle state in response to determining that the wireless mobile device is idle.

70. The method of claim 55, further comprising entering the idle state when the wireless mobile device is idle for a predetermined period of time.

71. A method of displaying idle content information on a wireless mobile device, said method comprising:
receiving, from a wireless network, idle content information specified by an address identifier identifying a network resource in said wireless network, said network resource comprising said idle content information;
determining whether said wireless mobile device is idle; and
displaying said idle content information when said wireless mobile device is idle and after the wireless mobile device has entered an idle state, wherein, in the idle state, the wireless mobile device is responsive to:

a first command, receivable in a first predetermined part of a user interface that is visually associated with but not the same as the displayed idle content information, to display additional information relating to said idle content information; and a second command that is different than the first command, said second command being receivable in a second predetermined part of the user interface that is different than the first predetermined part and that is not visually associated with the displayed idle content information, to enter a different state than the idle state.

72. The method of claim 71, further comprising, if a user input is received in a third predetermined part of the user interface that is different than the first predetermined part and different than the second predetermined part, activating a third command to enter a telephone dialing state.

73. The method of claim 71, wherein said idle content information comprises a plurality of selectable information elements, and wherein the first command is activated in response to selection of at least one of the plurality of selectable information elements.

74. The method of claim 73, wherein the at least one of the plurality of selectable information elements relates to an email message.

75. The method of claim 73, wherein the first command relates to the at least one of the plurality of selectable information elements.

76. The method of claim 75, further comprising, responsive to the activation of the first command, displaying additional information relating to the at least one of the plurality of selectable information elements.

77. The method of claim 76, wherein the at least one of the plurality of selectable information elements relates to an email message and wherein the additional information which is displayed comprises the email message.

78. The method of claim 76, further comprising retrieving the additional information via a Uniform Resource Locator (URL) link.

79. The method of claim 73, further comprising, in the idle state, scrolling the plurality of selectable information elements, whereby different ones of the plurality of selectable elements are displayed during the scrolling.

80. The method of claim 71, wherein the different state is a default, non-idle, state of the wireless mobile device.

81. The method of claim 80, wherein the default, non-idle, state is a state which is exited when an application is activated, and which is entered when the application is deactivated.

82. The method of claim 71, further comprising, responsive to an activation of the first command, displaying additional information relating to said idle content information.

83. The method of claim 82, further comprising retrieving the additional information via a Uniform Resource Locator (URL) link.

84. The method of claim 71, further comprising not displaying said idle content information for at least some time during the idle state of said wireless mobile device when said wireless mobile device is idle.

85. The method of claim 71, further comprising entering the idle state in response to determining that the wireless mobile device is idle.

86. The method of claim 71, further comprising entering the idle state when the wireless mobile device is idle for a predetermined period of time.

* * * * *